United States Patent
Watabe (10) Patent No.: US 7,391,705 B2
(45) Date of Patent: Jun. 24, 2008

(54) OPTICAL INFORMATION RECORDING APPARATUS, INFORMATION PROCESSING APPARATUS, OPTICAL INFORMATION RECORDING MEDIUM, OPTICAL INFORMATION RECORDING METHOD, AND COMPUTER-READABLE STORAGE MEDIUM

(75) Inventor: Teruyasu Watabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 284 days.

(21) Appl. No.: 11/267,337

(22) Filed: Nov. 7, 2005

(65) Prior Publication Data

US 2006/0062113 A1 Mar. 23, 2006

Related U.S. Application Data

(63) Continuation of application No. 10/927,440, filed on Aug. 27, 2004, now Pat. No. 7,035,185, which is a continuation of application No. PCT/JP04/03909, filed on Mar. 23, 2004.

(30) Foreign Application Priority Data

Mar. 25, 2003 (JP) ............................ 2003-083642

(51) Int. Cl.
*G11B 7/00* (2006.01)
(52) U.S. Cl. ..................... 369/116; 369/47.5; 369/59.1; 369/275.1
(58) Field of Classification Search ................. None
See application file for complete search history.

(56) References Cited

U.S. PATENT DOCUMENTS

| 5,850,382 | A | 12/1998 | Koishi et al. |
|---|---|---|---|
| 5,936,933 | A | 8/1999 | Miyamoto et al. |
| 6,075,761 | A | 6/2000 | Akiyama et al. |
| 6,198,710 | B1 | 3/2001 | Hori et al. |
| 2002/0021656 | A1 | 2/2002 | Tsukagoshi et al. |
| 2002/0136122 | A1 | 9/2002 | Nakano |
| 2003/0058771 | A1 | 3/2003 | Furukawa et al. |
| 2003/0137909 | A1* | 7/2003 | Ito et al. ................... 369/47.14 |
| 2003/0137915 | A1 | 7/2003 | Shoji et al. |
| 2003/0156514 | A1* | 8/2003 | Suzuki ..................... 369/47.53 |

FOREIGN PATENT DOCUMENTS

| CN | 1173700 | 2/1998 |
|---|---|---|
| CN | 1173705 | 2/1998 |
| CN | 1210609 | 3/1999 |
| CN | 1221509 | 6/1999 |
| JP | 06-176368 | 6/1994 |
| JP | 11-3550 | 1/1999 |
| JP | 11-195243 | 7/1999 |
| JP | 2000-311346 | 11/2000 |

(Continued)

*Primary Examiner*—Muhammad Edun
(74) *Attorney, Agent, or Firm*—Dickstein Shapiro LLP (57) ABSTRACT

An optical information recording method records information with respect to an optical information recording medium having a multi-layer structure recording layer formed by a plurality of recording layers each capable of recording information, and carries out an Optimum Power Control (OPC) prior to carrying out the recording. Recording conditions that are used when carrying out the OPC are read from one of the recording layers of the optical information recording medium to which the recording is to be made, where each of the recording layers is recorded with the recording conditions therefor, and the OPC is carried out using the read recording conditions.

20 Claims, 10 Drawing Sheets

FOREIGN PATENT DOCUMENTS

| | | |
|---|---|---|
| JP | 2001-52337 | 2/2001 |
| JP | 2001-184792 | 7/2001 |
| JP | 2002-50053 | 2/2002 |
| JP | 2003-22532 | 1/2003 |
| JP | 2003-30842 | 1/2003 |
| JP | 2003-059062 | 2/2003 |
| JP | 2004-206849 | 7/2004 |
| WO | WO-02/29791 | 4/2002 |

* cited by examiner

OPTICAL INFORMATION RECORDING APPARATUS, INFORMATION PROCESSING APPARATUS, OPTICAL INFORMATION RECORDING MEDIUM, OPTICAL INFORMATION RECORDING METHOD, AND COMPUTER-READABLE STORAGE MEDIUM

This application is a U.S. Continuation Application of U.S. application Ser. No. 10/927,440, filed on Aug. 27, 2004 now U.S. Pat. No. 7,035,185, which in turn was filed under 35 U.S.C. 111(a) claiming benefit under 35 U.S.C. 120 and 365(c) of a PCT International application No.PCT/JP2004/003909 filed Mar. 23, 2004, which claims priority of a Japanese Patent Application No. 2003-083642 filed Mar, 23, 2003, in the Japanese Patent Office, the disclosures of which, including the disclosure of Application No. 10/927,440, are hereby incorporated by reference.

BACKGROUND OF THE INVENTION

1. Field of the Invention

The present invention generally relates to optical information recording apparatuses, information processing apparatuses, optical information recording media, optical information recording methods and computer-readable storage media, and more particularly to an optical information recording apparatus and an optical information recording method for recording information on an optical information recording medium having a multi-layer structured recording layer made up of a plurality of recording layers each capable of recording information, an optical information recording medium having a recording layer with a multi-layer structured recording layer made up of a plurality of recording layers each capable of recording information, an information processing apparatus having such an optical information recording apparatus for recording information on such an optical information recording medium, and a computer-readable storage medium which stores a program for causing a computer to record or to control an optical information recording apparatus to record information on such an optical information recording medium having the multi-layer structured recording layer.

2. Description of the Related Art

For example, a Japanese Laid-Open Patent Application No. 11-195243 proposes a recording medium having a multi-layer structured recording layer, and recording and reproducing methods for such a recording medium.

In addition, a Japanese Laid-Open Patent Application No. 2002-50053 proposes a technique for recording information that is unique to a data layer in each of the data layers forming a multi-layer structured recording layer of an optical medium.

Furthermore, a Japanese Laid-Open Patent Application No. 2000-311346 proposes an Optimum Power Control (OPC) with respect to an optical disk having a multi-layer structured recording layer.

Due to the popular use of multi-media, music CDs, CD-ROMs, read-only media (recording media) such as DVD-ROMs, and information reproducing apparatuses therefor have been reduced to practice. Recently, much attention is drawn to write-once optical disks using dye media, rewritable Magneto-Optic (MO) disks using MO media, and phase change type media, and information recording and reproducing apparatus which use such recording media have also been reduced to practice. Rewritable DVD media are expected to become the next-generation multi-media recording media and large-capacity storage media.

The phase change type media record the information by making a reversible phase change of a recording material between a crystal phase and an amorphous phase. Unlike the MO media and the like, the phase change type media do not require an external magnetic field, and information can be recorded on and reproduced from the phase change type media by simply irradiating a laser beam from a light source such as a semiconductor laser onto the phase change type media. Furthermore, an overwrite recording can be made with respect to the phase change type media by the laser beam which simultaneously carries out the erasure and recording of the information.

Figure 1:
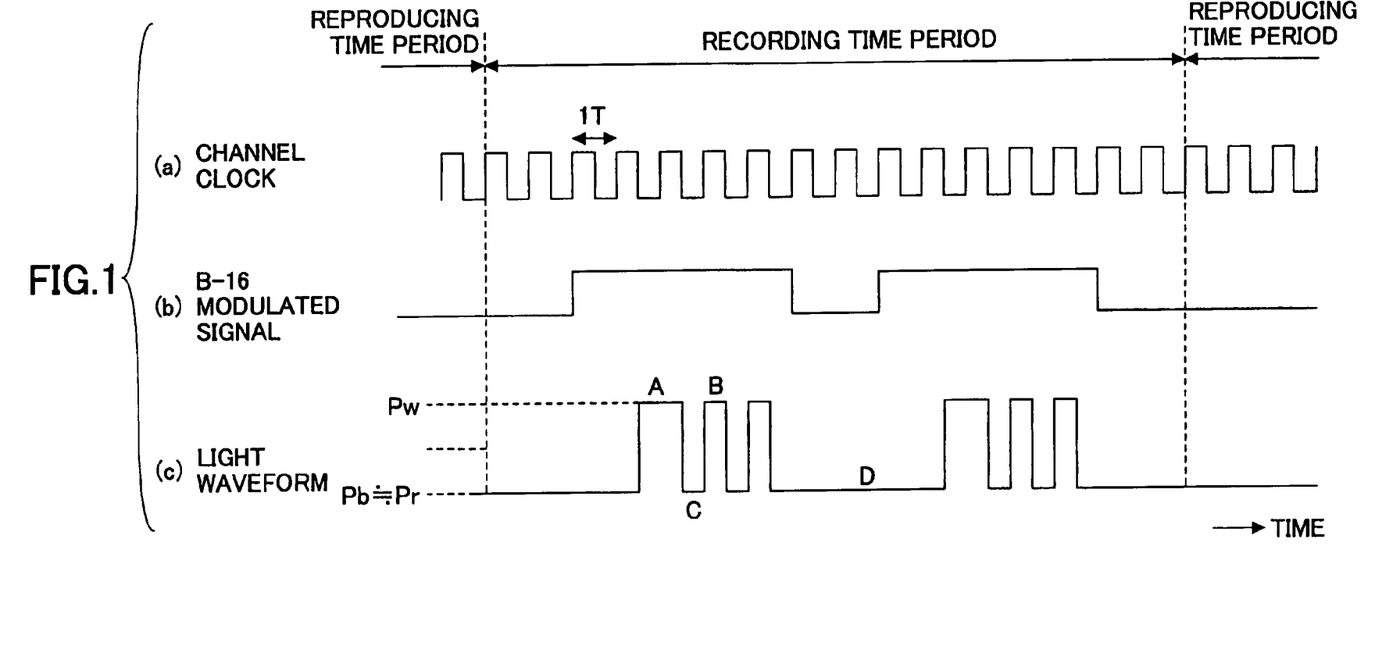
FIG. 1 is a timing chart showing a channel clock, an 8-16 modulated signal and an optical waveform in an optical information recording and reproducing apparatus.

For example, as a general recording waveform for use in making a recording on the dye media, there is a single-pulse semiconductor laser emission waveform that is generated based on an 8-16 modulation code or the like. When using the single-pulse recording waveform for the recording, a recording mark may become distorted to a tear-drop shape due to accumulated heat. For this reason, as a Laser Diode (LD) light emission waveform strategy for recording information on the dye media, a system has been proposed to form marks on the dye media by use of a laser beam having a multi-pulse waveform based on recorded data such as an EFM modulation code, as shown in FIG. 1(c). FIG. 1 is a timing charge showing a channel clock, an 8-16 modulated signal and an optical waveform in the optical information recording and reproducing apparatus. FIG. 1(a) shows the channel clock, and FIG. 1(b) shows the 8-16 modulated signal. A system has been proposed to form a mark portion of the multi-pulse waveform shown in FIG. 1(c) by a leading heating pulse and a plurality of consecutive heating pulses which follow the leading heating pulse. In FIG. 1(c), Pw denotes a write power (power when the heating pulse is ON), Pb denotes a bias, power (power when the heating pulse is OFF), Pr denotes a read power, A denotes the leading heating pulse, B denotes the plurality of consecutive heating pulses, C denotes consecutive cooling pulses between the consecutive heating pulses, an D denotes an erase pulse. Normally, the power is not turned OFF completely when the heating pulse is OFF, and the bias power Pb which is approximately the same as the read power. Pr is applied.

Generally, an optimum value of the recording power when making the recording with respect to the optical recording medium changes depending on an ambient temperature, the kind of recording medium, a linear velocity and the like. Hence, when making the recording with respect to the dye medium or the phase change type medium, the optical information recording apparatus optimizes the recording power prior to recording the information by carrying out the Optimum Power Control (OPC) which performs a test write. The OPC is carried out by recording predetermined information in a predetermined area of the recording medium called a Power Calibration Area (PCA), and reproducing the predetermined information.

More particularly, test data having a predetermined pattern made up of marks and spaces amounting to 3 times (3T) to 14 times (14T) of a period T of the channel clock, are recorded on the optical recording medium by varying the light emission power in several levels. The recorded test data are reproduced, and a DC modulation of an RF signal, an asymmetry of the RF signal after AC coupling, and the like at each power level are calculated as evaluation references. A modulation M may be calculated as follows, where Ip–p denotes a maximum amplitude of the RF signal and Imax denotes a maximum value of the RF signal.

$$M = Ip\text{-}p/I\max \qquad (1)$$

In addition, an asymmetry β after the AC coupling may be described by the following, where X1 denotes a positive peak level of the RF signal after the AC coupling, X2 denotes a negative peak level of the RF signal after the AC coupling.

$$\beta=(X1+X2)/(X1-X2) \quad (2)$$

In the above, "X1+X2" indicates a difference between the positive and negative peak levels of the RF signal after the AC coupling, and "X1−X2" indicates a peak-to-peak value of the RF signal after the AC coupling.

The optimum recording power is obtained based on the modulation M and the asymmetry β after the AC coupling described above.

When recording information on the write-once or rewritable medium, it is necessary to set the recording conditions depending on the type of the medium. Generally, the recording conditions include the setting of the recording power and the setting of the recording pulse shape that are used when carrying out the OPC. In a case where the optical information recording apparatus is capable of specifying the type (manufacturer's name, type identification information, etc.) of the medium to which the recording is to be made, the recording conditions for the medium may be prestored in a memory within the optical information recording medium. In the case of the DVD+R and DVD+RW media, the manufacturer and type of the medium are prerecorded in a wobble signal recorded in a pre-groove that is formed on a recording track, called an Address In Groove (ADIP), in a predetermined region of the medium.

In a case where the optical recording apparatus is not capable, of specifying the type of the medium (unknown medium), the recording conditions that are specified by the manufacturer of the medium are recorded in the ADIP information in the predetermined region, and thus, the recording power setting and the recording pulse shape can be determined based on the recording conditions when carrying out the OPC.

As one approach to increase the amount of information recorded on the optical recording medium as compared to the conventional case, there is a known technique that forms the recording surface by multiple layers. In the DVD-ROM media, this technique is already reduced to practice for media having there cording surface with a 2-layer structure. As described above, the structure and the recording method for the recordable medium having the multi-layer structured recording layer are proposed in the Japanese Laid-Open Patent Application No. 11-195243, for example.

In a case where the multi-layer structured recording layer is employed in the write-once or rewritable media, the recording conditions must be set for each layer forming the multi-layer structured recording layer since the recording characteristics differs for each layer forming the multi-layer structured recording layer.

If the optical information recording apparatus is capable of specifying the type of the medium, the recording conditions for each layer forming the multi-layer structured recording layer may be prestored in the memory within the optical information recording apparatus. But if the optical information recording apparatus is not capable of specifying the type of the medium, such as the case where the type of the medium is unknown, optimum recording conditions cannot be set, for each layer forming the multi-layer structured recording layer, to thereby deteriorate the recording quality.

In the case of the medium recorded with the recording conditions of each layer forming the multi-layer structured recording layer in each layer as proposed in the Japanese Laid-Open Patent Application No. 2002-50053, the recording conditions can be read from each layer forming the multi-layer structured recording layer even if the medium is unknown to the optical information recording apparatus.

But conventionally, there is no known optical information recording apparatus which carries out the OPC, with respect to the medium recorded with the recording conditions of each layer forming the multi-layer structured recording layer in each layer of the multi-layer structured recording layer, using the recording conditions of each layer reproduced from the medium.

SUMMARY OF THE INVENTION

Accordingly, it is a general object of the present invention to provide a novel and useful optical information recording apparatus, information processing apparatus, optical information recording medium, optical information recording method and computer-readable storage medium in which the problems described above are eliminated.

Another and more specific object of the present invention is to provide an optical information recording apparatus, an information processing apparatus, an optical information recording medium, and optical information recording method and a computer-readable storage medium, which enable an OPC to be carried out with respect to an optical information recording medium having a multi-layer structured recording layer and recorded with OPC recording conditions of each layer forming the multi-layer structured recording layer in each layer forming the multi-layer structured recording layer, by using the recording conditions of each layer reproduced from the optical information recording medium.

Still another and more specific object of the present invention is to provide an optical information recording apparatus which records information with respect to an optical information recording medium having a multi-layer structured recording layer made up of a plurality of recording layers each capable of recording information, and carries out an Optimum Power Control (OPC) prior to recording, comprising a recording condition acquiring part configured to read recording conditions that are used when carrying out the OPC from one of the recording layers of the optical information recording medium to which the recording is to be made, each of the recording layers being recorded with the recording conditions therefor; and an OPC executing part configured to carry out the OPC using the recording conditions acquired by said recording condition acquiring part. According to the optical information recording apparatus of the present invention, it is possible to read the OPC recording conditions for the recording layer to which the information is to be recorded, from this recording layer, and carry out a most suitable OPC with respect to this recording layer.

In the optical information recordings apparatus, the OPC executing part may carry out the OPC in advance with respect to all of the recording layers to which the recording is to be made, when continuously carrying out the recording with respect to a plurality of recording layers of the multi-layer structured recording layer. In this case, since the OPC is carried out with respect to all of the plurality of recording, layers to which the recording is to be made when continuously carrying out the recording with respect to the plurality of recording layers, it is possible to carry out the recording operation without interruption when switching from one recording layer to another.

In the optical information recording apparatus, the recording condition acquiring part may read the recording conditions for all of the recording layers from one of a plurality of recording layers to which the recording is to be made, when continuously carrying out the recording with respect to the plurality of recording layers of the multi-layer structured recording layer. In this case, since the recording conditions for all of the recording layers can be read from a single recording, layer without having to read the recording conditions from each of the recording layers, it is possible to reduce the time required to read the recording conditions even when continuously carrying out the recording with respect to the plurality of recording layers.

In the optical information recording apparatus, at least a portion of the recording conditions may include a recording power setting for carrying out the OPC. In this case, it is possible to read the recording power setting as the OPC recording conditions for the recording layer to which the information is to be recorded, from this recording layer, and carry out a most suitable OPC with respect to this recording layer.

In the optical information recording apparatus at least a portion of the recording conditions may include a recording pulse waveform setting for carrying out the OPC. In this case, it is possible to read the recording pulse waveform setting as the OPC recording conditions for the recording layer to which the information is to be recorded, from this recording layer, and carry out a most suitable OPC with respect to this recording layer.

In the optical information recording apparatus, at least a portion of the recording conditions may include a recording, light wavelength for carrying out the OPC. In this case, it is possible to read the recording light wavelength as the OPC recording conditions for the recording layer to which the information is to be recorded, from this recording layer, and carry out almost suitable OPC with respect to this recording layer.

In the optical information recording apparatus, at least a portion of the recording conditions may include a maximum recording velocity for carrying out the OPC. In this case, it is possible to read the maximum recording velocity as the OPC recording conditions for the recording layer to which the information is to be recorded, from this recording layer, and carry out a most suitable OPC with respect to this recording layer.

A further object of the present invention is to provide an information processing apparatus for carrying out various information processing, and comprising the optical information recording apparatus described above. According to the information processing apparatus of the present invention, it is possible to read the OPC recording conditions for the recording layer to which the information is to be recorded, from this recording layer, and carry out a most suitable OPC with respect to this recording layer.

Another object of the present invention is to provide an optical information recording medium comprising a multi-layer structure recording layer formed by a plurality of recording layers each capable of recording information, wherein each of the recording layers is recorded with recording conditions for all of the recording layers that are used when carrying out an Optimum Power Control (OPC). According to the optical information recording medium of the present invention, it is possible to read the OPC recording conditions for the recording layer to which the information is to be recorded, from this recording layer, and carry out a most suitable OPC with respect to this recording layer.

Still another object of the present invention is to provide an optical information recording method which records information with respect to an optical information recording medium having a multi-layer structured recording layer made up of a plurality of recording layers each capable of recording information, and carries out an Optimum Power Control (OPC) prior to recording, comprising a recording condition acquiring step reading recording conditions that are used when carrying out the OPC from one of the recording layers of the optical information recording medium to which the recording is to be made, each of the recording layers being recorded with the recording conditions therefor; and an OPC executing step carrying out the OPC using the recording conditions acquired by said recording condition acquiring step. According to the optical information recording method of the present invention, it is possible to read the OPC recording conditions for the recording layer to which the information is to be recorded, from this recording layer, and carry out a most suitable OPC with respect to this recording layer.

In the optical information recording method, the OPC executing step may carry out the OPC in advance with respect to all of the recording layers to which the recording is to be made, when continuously carrying out the recording with respect to a plurality of recording layers of the multi-layer structured recording layer. In this case, since the OPC is carried out with respect to all of the plurality of recording layers to which the recording is to be made when continuously carrying out the recording with respect to the plurality of recording layers, it is possible to carry out the recording operation without interruption when switching from one recording layer to another.

In the optical information recording method, the recording condition acquiring step may read the recording conditions for all of the recording layers from one of a plurality of recording layers to which the recording is to be made, when continuously carrying out the recording with respect to the plurality of recording layers of the multi-layer structured recording layer. In this case, since the recording conditions for all of the recording layers can be read from a single recording layer without having to read the recording conditions from each of the recording layers, it is possible to reduce the time required to read the recording conditions even when continuously carrying out the recording with respect to the plurality of recording layers.

In the optical information recording method, at least a portion of the recording conditions may include a recording power setting for carrying out the OPC. In this case, it is possible to read the recording power setting as the OPC recording conditions for the recording layer to which the information is to be recorded, from this recording layer, and carry out a most suitable OPC with respect to this recording layer.

In the optical information recording method, at least a portion of the recording conditions may include a recording pulse waveform setting for carrying out the OPC. In this case, it is possible to read the recording pulse waveform setting a the OPC recording conditions for the recording layer to which the information is to be recorded, from this recording layer, and carry out a most suitable OPC with respect to this recording layer.

In the optical information recording method, at least a portion of the recording conditions may include a recording light wavelength for carrying out the OPC. In this case, it is possible to read the recording light wavelength as the OPC recording conditions for the recording layer to which the information is to be recorded, from this recording layer, and carry out a most suitable OPC with respect to this recording layer.

In the optical information recording method, at least a portion of the recording conditions may include a maximum recording velocity for carrying out the OPC. In this case, it is possible to read the maximum recording velocity as the OPC recording conditions for the recording layer to which the information is to be recorded, from this recording layer, and carry out a most suitable OPC with respect to this recording layer.

A further object of the present invention is to provide a computer-readable storage medium which stores a program for causing a computer to record information with respect to an optical information recording medium having a multi-layer structured recording layer made up of a plurality of recording layers each capable of recording information, and to carry out an Optimum Power Control (OPC) prior to recording, said program comprising a recording condition acquiring procedure causing the computer to read recording conditions that are used when carrying out the OPC from one of the recording layers of the optical information recording medium to which the recording is to be made, each of the recording layers being recorded with the recording conditions therefor; and an OPC executing procedure causing the computer to carry out the OPC using the recording conditions acquired by said recording condition acquiring procedure. According to the computer-readable storage medium of the present invention, it is possible to read the OPC recording conditions for the recording layer to which the information is to be recorded, from this recording layer, and carry out a most suitable OPC with respect to this recording layer.

In the computer-readable storage medium, the OPC executing procedure may cause the computer to carry out the OPC in advance with respect to all of the recording layers to which the recording is to be made, when continuously carrying out the recording with respect to a plurality of recording layers of the multi-layer structured recording layer. In this case, since the OPC is carried out with respect to all of the plurality of recording layers to which the recording is to be made when continuously carrying out the recording with respect to the plurality of recording layers, it this possible to carry out the recording operation without interruption when switching from one recording layer to another.

In the computer-readable storage medium, the recording condition acquiring procedure may cause the computer to read the recording conditions for all of the recording layers from one of a plurality of recording layers to which the recording is to be made, when continuously carrying out the recording with respect to the plurality of recording layers of the multi-layer structured recording layer. In this case, since the recording conditions for all of the recording layers can be read from a single recording layer without having to read the recording conditions from each of the recording layers, it is possible to reduce the time required to read the recording conditions even when continuously carrying out the recording with respect to the plurality of recording layers.

Other objects and further features of the present invention will be apparent from the following detailed description when read in conjunction with the accompanying drawings.

DESCRIPTION OF THE PREFERRED EMBODIMENTS

A description will be given of each embodiment of an optical information recording apparatus, an information processing apparatus, an optical information recording medium, an optical information recording method and a computer-readable storage medium according to the present invention, by referring to the drawings.

Figure 2:
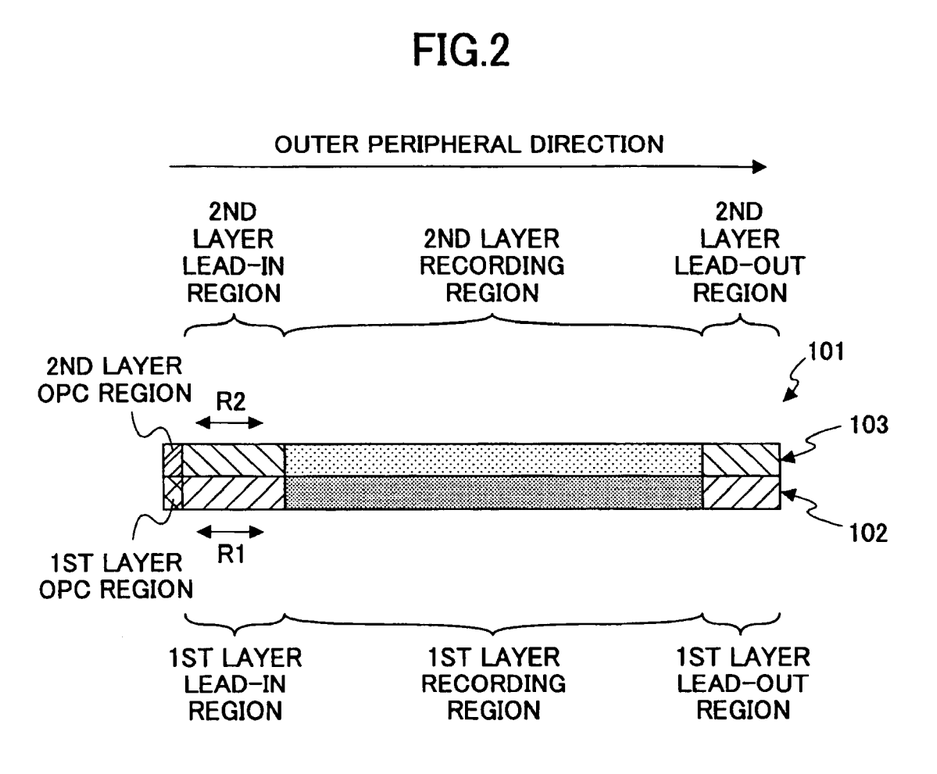
FIG. 2 is a diagram showing a media structure in an embodiment of the present invention.

FIG. 2 is a diagram for explaining a medium (optical information recording medium) with respect to which an optical information recording and reproducing apparatus 1, forming an embodiment of the present invention, carries out the recording and reproduction. As shown in FIG. 2, a medium 101 is made up of a dye medium having a recording layer with a 2-layer structure, namely, a recording layer 102 and a recording layer 103. Code data in conformance with the DVD-ROM format are recorded by a mark edge recording (PWM: Pulse Width Modulation) using an 8-16 modulation code as the data modulation technique. In a case where the medium 101 is an optical disk, an arrow pointing towards the right in FIG. 2 indicates an outer peripheral direction of the optical disk.

In addition, it is assumed that address information or the like of a track is recorded in a wobble signal that is recorded in a pre-groove formed on a recording track of each of the recording layers 102 and 103.

Figure 3:
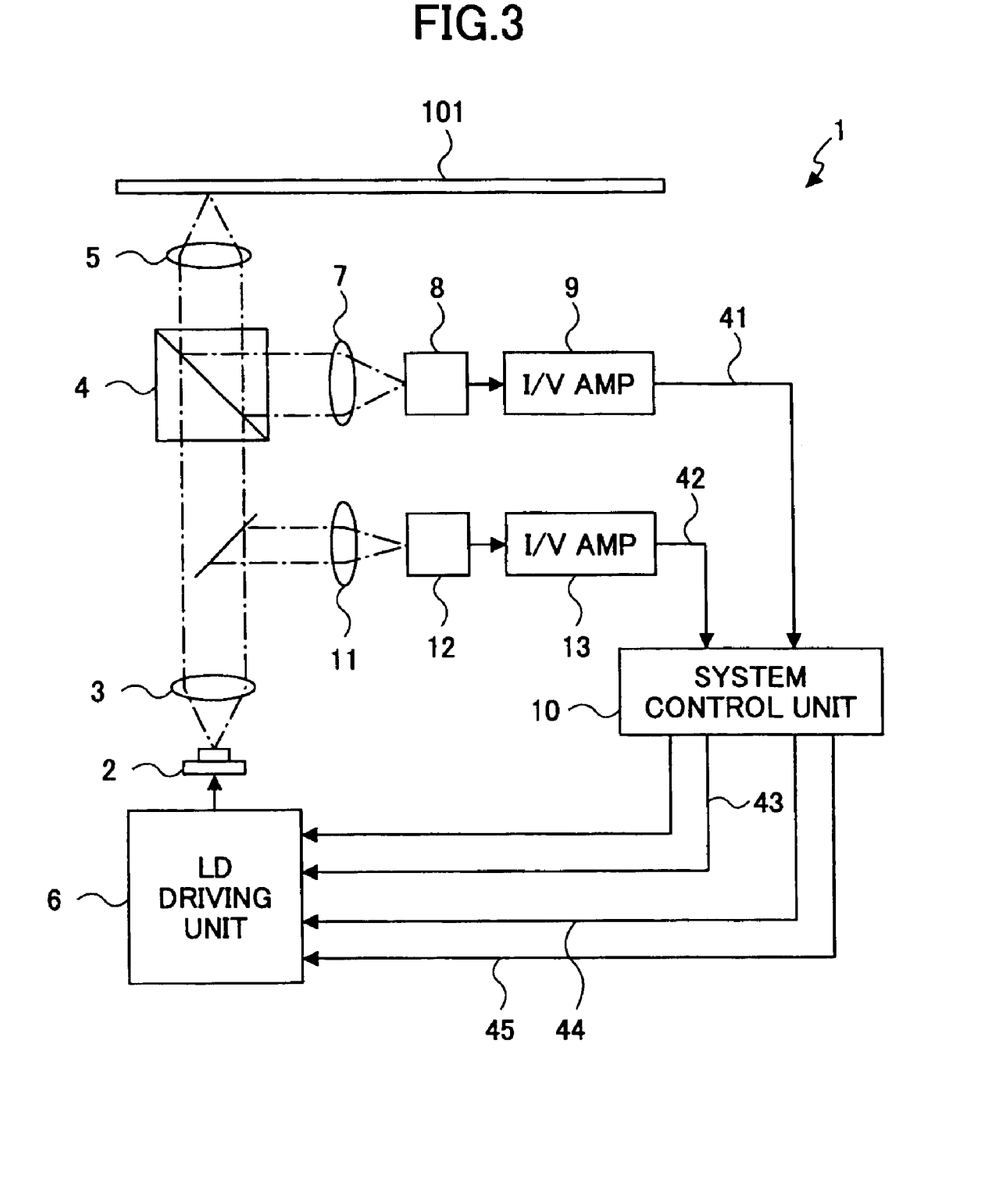
FIG. 3 is a block diagram showing a structure of an optical information recording and reproducing apparatus in an embodiment of the present invention.
Figure 4:
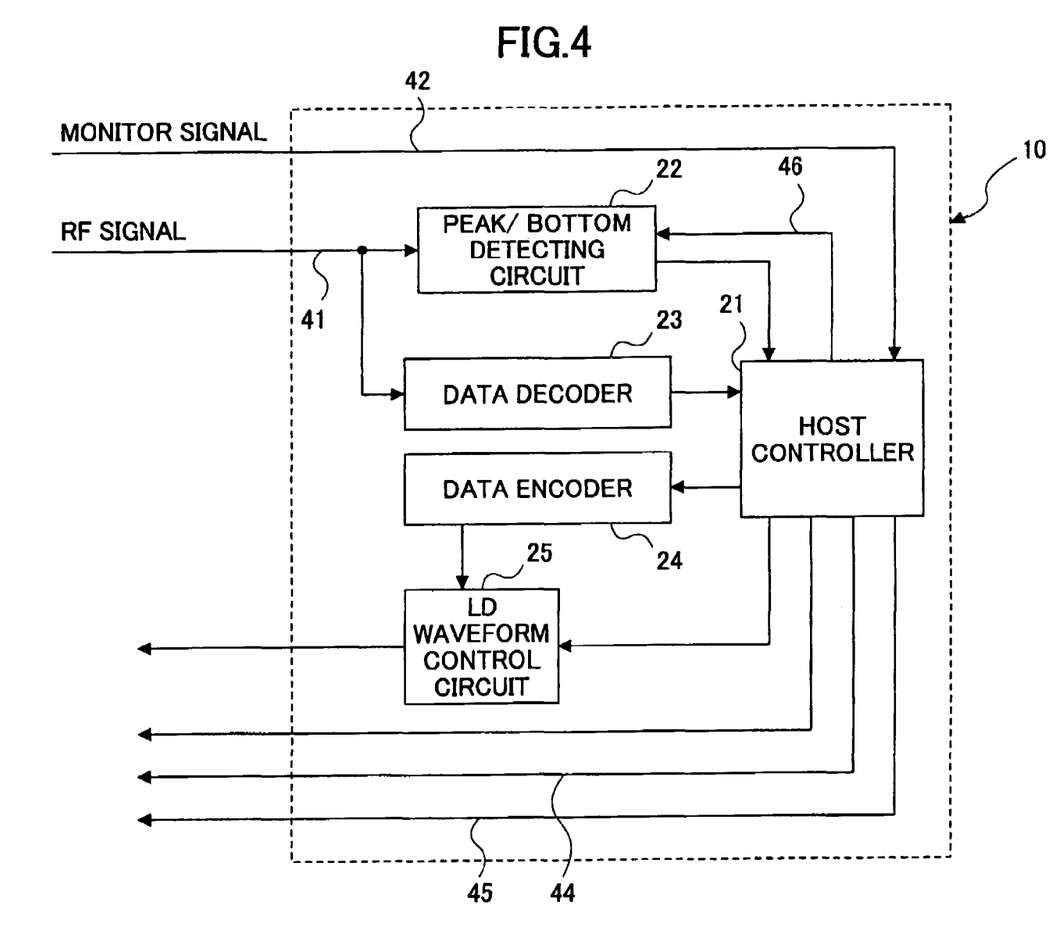
FIG. 4 is a block diagram showing a structure of a system control unit of the information recording and reproducing apparatus.

FIG. 3 is a block diagram showing a general structure of the optical information recording and reproducing apparatus 1 forming the embodiment of the present invention, and FIG. 4 is a block diagram showing a structure of a system control unit 10.

The optical information recording and reproducing apparatus 1 forms the embodiment of the optical information recording apparatus according to the present invention, and uses the medium 101 described above in conjunction with FIG. 2 and recording data, to record information by making multi-pulse light emission from a semiconductor laser and forming recording marks.

When reproducing the information, the optical information recording and reproducing apparatus 1 drives a Laser Diode (LD) light source 2 shown in FIG. 3 by a driving unit 6, so that the LD light source 2 makes the light emission at a reproducing-power (read power Pr). In an optical pickup that is not shown, the light from the LD light source 2 and having the reproducing power is irradiated, via predetermined optical elements 3, 4 and 4, onto a predetermined one of the recording layers 102 and 103 (see FIG. 2) of the medium 101 in an in-focus state. The reflected light is received by a light receiving element 8 via predetermined optical elements 5, 4 and 7, and subjected to photoelectric conversion. A current signal obtained by the conversion is subjected to current-to-voltage (I/V) conversion and amplification in an I/V conversion amplifier 9, so as to obtain a reproduced signal (RF signal) 41.

Furthermore, a portion of the light emitted from the LD light source 2 reaches a monitoring Photo Diode (PD) 12 via a predetermined optical element 11 or the like. A monitored current proportional to the light emission power is obtained from the PD 12 and subjected to I/V conversion and amplification in an I/V conversion amplifier 13, so as to obtain an amplified power monitor signal 42. An OPC can be carried out using the amplified power monitor signal 42.

When recording the information, a host controller 21 generates a pulse control signal 43 based on recorded data made up of the 8-16 modulation code. The LD driving unit 6 drives the LD light source 2 by a driving current that is dependent on the pulse control signal 43, so as to emit a multi-pulse light having a light waveform shown in FIG. 1(*c*). By irradiating this multi-pulse light on the predetermined one of the recording layers 102 and 103 of the medium 101, the information is recorded by forming recording marks. In addition, the host controller 21 outputs a bias level current driving signal 44 and a peak level current superimposing signal 45 to the LD driving unit 6, so as to control the light emission level, to the space and/or peak power. The bias level current corresponds to the bias power Pb, and a peak level current corresponds to the write power Pw.

Figure 5:
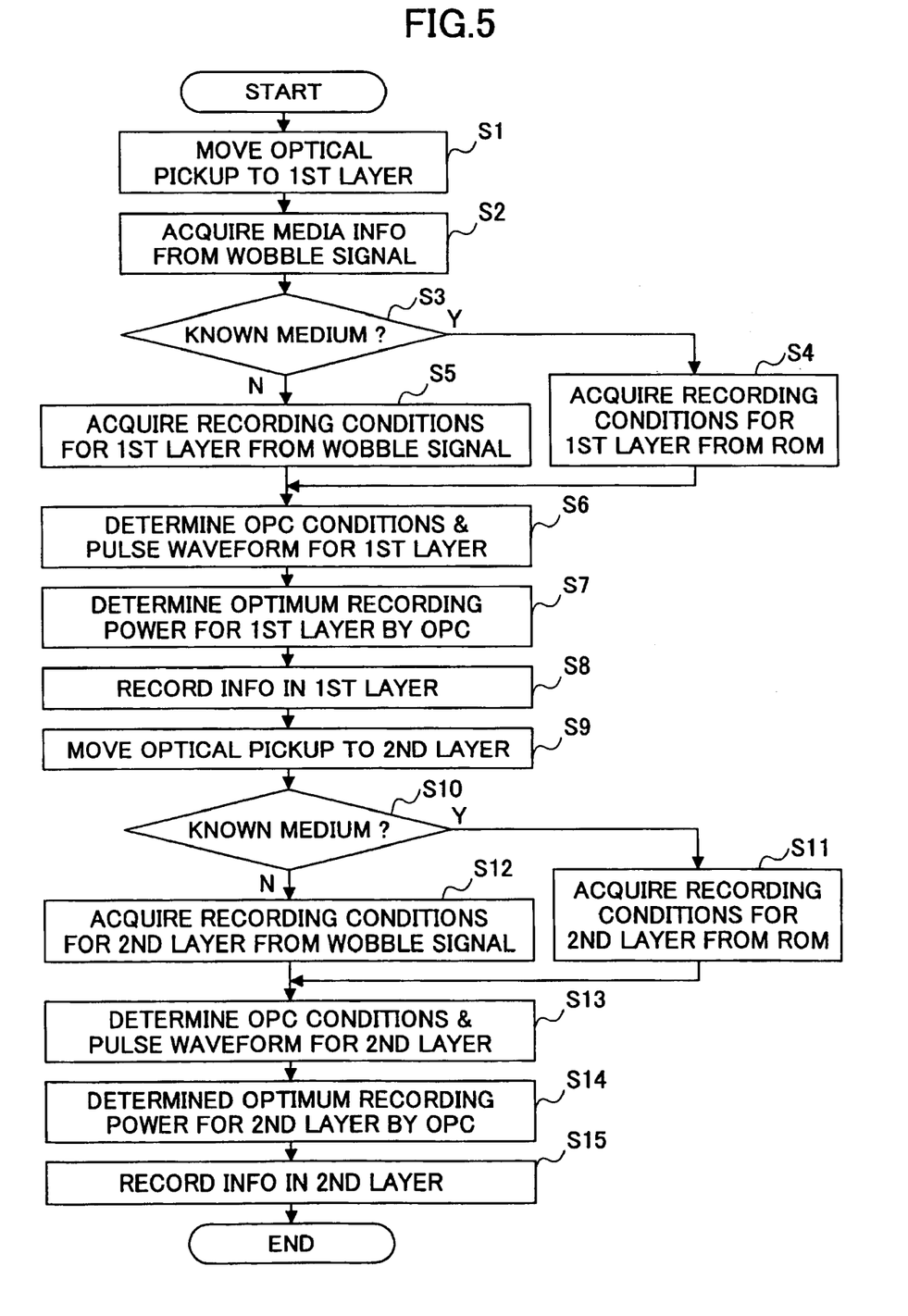
FIG. 5 is a flow chart of a process carried out by the optical information recording and reproducing apparatus.

The host controller 21 shown in FIG. 4 is formed by a control unit mainly including a CPU or microcomputer that controls the entire optical information recording and reproducing apparatus 1, and a storage unit such as a ROM and a RAM. A peak and/or bottom detecting circuit 22 detects a peak and/or a bottom of the RF signal 41, and outputs the detected peak and/or bottom to the host controller 21. A data decoder 23 decodes the RF signal 41 and outputs a decoded result to the host controller 21. A data encoder 24 encodes recording information from the host controller 21. An LD waveform control circuit 25 drives the LD driving unit 6 and controls the waveform of the laser light output from the LD light source 2 based on the decoded information. Although a detailed description will be omitted, the optical information recording and reproducing apparatus 1 is provided with an actuator, a driving mechanism and a control system having known structures to control the optical pickup that is not shown, so as to carry out a focusing operation, a tracking operation and a seek operation Next, a description will be given of a procedure of a process of the optical information recording and reproducing apparatus 1 for continuously carrying out the recording with respect to the plurality of recording layers 102 and 103, by referring to FIG. 5. FIG. 5 is a flow chart of the process carried out by the optical information recording and reproducing apparatus 1, and corresponds to an embodiment of the optical information recording method according to the present invention.

First, in a step S1, (CPU of) the host controller 21 moves the optical pickup that is not shown to the target first recording layer 102 of the medium 101, in order to acquire information (media information) for identifying the type of the medium 101 from the first recording layer 102. As shown in FIG. 2, a management information region of the medium 101, called a lead-in region, is provided on an inner peripheral side of the recording region of each of the layers 102 and 103, and the media information of the medium 101 is recorded as a wobble signal in one of the lead-in regions (regions R1 and R2 shown in FIG. 2). The media information and/or the recording conditions of the first recording layer 102 are recorded in the region R1, and the media information and/or the recording conditions of the second recording layer 103 are recorded in the region R2. From the wobble signal, the optical information recording apparatus 1 can acquire the media information for identifying the manufacturer's name and the media type assigned by the manufacturer. Next, the step S2 reproduces one of the lead-in regions and acquires the media information of the medium 101 from the wobble signal.

If the type of the medium 101 identified from the wobble signal is a media type known to the optical information recording and reproducing apparatus 1 and registered in advance in the ROM or the like of the host controller 21, a decision result in a step S3 becomes YES, and a step S4 is carried out. The step S4 determines the recording conditions (the recording power setting, recording pulse shape setting, light wavelength (laser wavelength) of recording light, maximum recording velocity and the like used when carrying out the OPC) to the values that are stored in the storage unit such as the ROM of the host controller 21 in the form of table data or the like for the media type of the medium 101. This step S4 realizes a recording condition acquiring means, a recording condition acquiring step and a recording condition acquiring process (or procedure). The recording conditions stored in the ROM or the like are recorded for each media type, with respect to each of the recording layers 102 and 103 of the medium 101.

If the type of the medium 101 identified from the wobble signal is a media type unknown to the optical information recording and reproducing apparatus 1 and not registered in advance in the ROM or the like of the host controller 21, the decision result in the step S3 becomes NO, and a step S5 is carried out. The step S5 reads the recording conditions which are recorded as the wobble signal within the lead-in regions (the regions R1 and R2 shown in FIG. 2) of the medium 101. The step S5 realizes the recording condition acquiring means, the recording condition acquiring step and the recording condition acquiring process (or procedure). The recording conditions are recorded for each of the recording layers 102 and 103. The recording conditions for the recording layer 102 are recorded in the region, R1 of the same recording layer 102, and the recording conditions for the recording layer 103 are recorded in the region R2 of the same recording layer 103.

In a step S6, OPC conditions and the recording pulse waveform are set based on the recording conditions of the recording layer 102 obtained in the step S4 or S5. The OPC conditions include a center power value at the time when the recording is carried out while varying the power, and a target asymmetry β. In the case where the medium 101 is known, the values of the OPC conditions can be suitably obtained experimentally in advance for each media type and registered in advance in the ROM or the like within the optical information recording and reproducing apparatus 1. On the other hand, in the case where the medium 101 is unknown and the values of the OPC conditions for the media type are not registered in the ROM or the like within the optical information recording and reproducing apparatus 1, it is possible to use the values which are obtained from the wobble signal in the step S2 as the values of the OPC conditions, as they are, but it is desirable to multiply a predetermined coefficient to the obtained values for use as the values of the OPC conditions.

Next, in order to determine the optimum recording power prior to the information recording operation, a step S7 carries out the OPC in a recording region and an OPC region of the recording layer 102 (see FIG. 2) to which the recording is to be made. The step S7 realizes an OPC executing means, an OPC executing step and an OPC executing process (or procedure).

Figure 6:
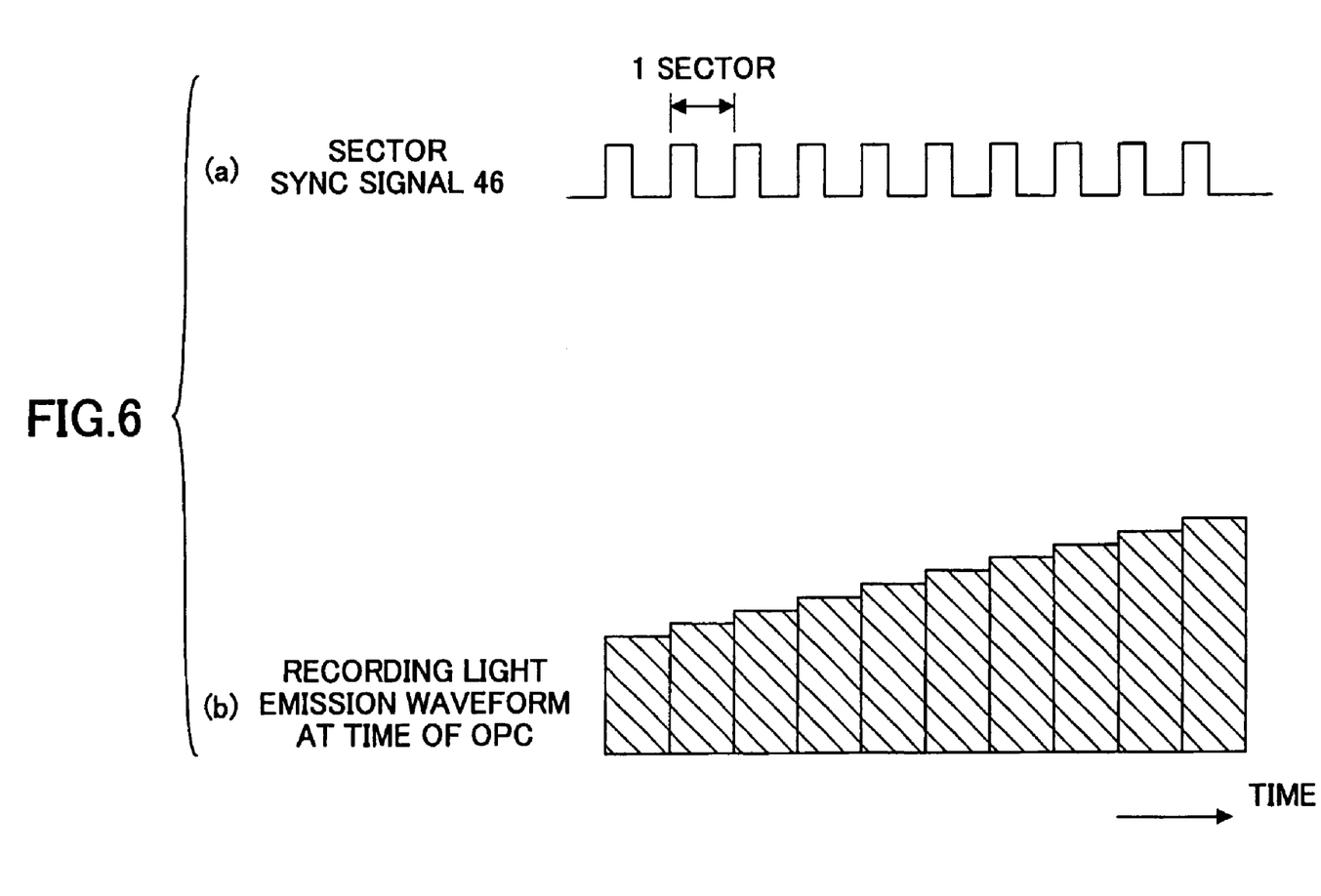
FIG. 6 is a diagram for explaining an OPC carried out by the optical information recording and reproducing apparatus.

When carrying out the OPC, the host controller 21 generates a sector synchronizing signal 46 every time a sector switches, as shown in FIG. 6(a), and updates a peak level current superimposing signal 45 every time the sector synchronizing signal 46 is generated, so as to vary the light emission power of the LD light source 2 in steps as shown in FIG. 6(b). FIG. 6 is a diagram for explaining the OPC carried out by the optical information recording and reproducing apparatus 1, and FIG. 6(a) shows the sector synchronizing signal 46, while FIG. 6(b) shows the recording light emission waveform at the time of the OPC. After the recording which varies the light emission power in steps ends, the recorded region is reproduced, and the RF signal 41 is sampled for each sector. By carrying out the operation based on the above described formula (2) or the like in the host computer 21, it is possible to calculate the asymmetry β of each sector and determine the light emission power at the time of the recording operation from the calculated asymmetry β.

When the optimum recording power is determined by carrying out the OPC, a step 58 carries out the information recording operation with respect to the first recording layer 102 by a known means.

When the OPC and the information recording carried out thereafter end with respect to the first recording layer 102, a step S9 moves the optical pickup that is not shown to the second recording layer 103. Steps S10 through S15 carry out the OPC and thereafter carry out the information recording, with respect to the second recording layer 103. The particular process carried out by the step S10 through S15 is similar to that carried out by the steps S2 through S8 described above, except that the second recording layer 103 is the target recording layer and the media information and the recording conditions are read from the region R2 shown in FIG. 2. Hence, a detailed description of the steps S10 through S15 will be omitted. The steps S11 and S12 realize the recording condition acquiring means, the recording condition acquiring step and the recording condition acquiring process (or procedure). The steps S14 realizes the OPC executing means, the OPC executing step and the OPC executing process (or procedure).

Therefore, according to the optical information recording and reproducing apparatus 1, the OPC recording conditions of the recording layers 102 and 103 to which the information is to be recorded can be reproduced from the corresponding recording layers 102 and 103, and an optimum OPC can be carried out with respect to the recording layers 102 and 103 based on the reproduced OPC recording conditions.

Figure 7:
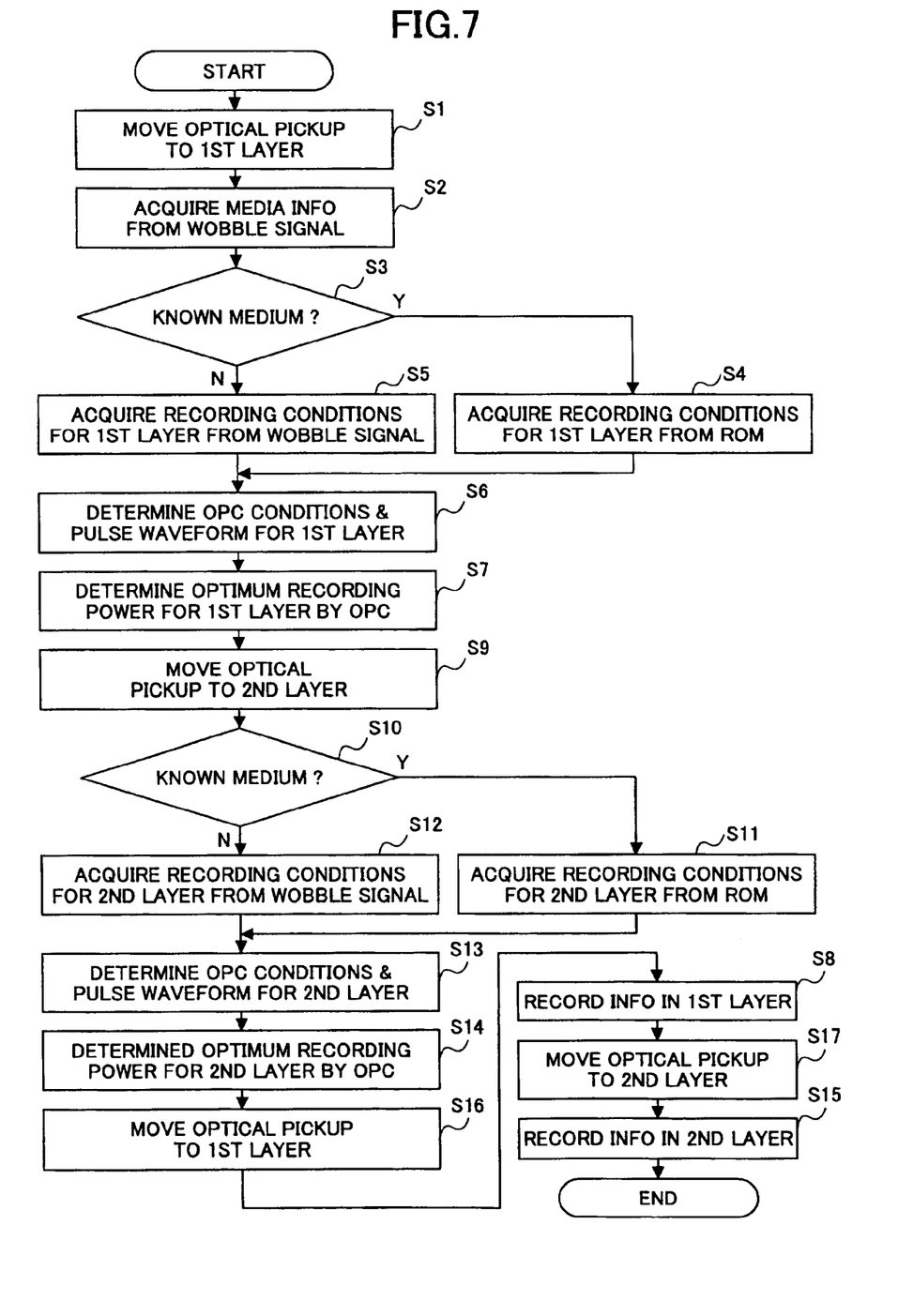
FIG. 7 is a flow chart of another process carried out by the optical information recording and reproducing apparatus.

In addition, it is possible to carry out a process shown in FIG. 7 in place of the process shown in FIG. 5. FIG. 7 is a flow chart of another process carried out by the optical information recording and reproducing apparatus 1. In FIG. 7, those steps which are similar to those corresponding steps in FIG. 5 are designated by the same reference numerals, and a detailed description thereof will be omitted. The process shown in FIG. 7 differs from the process shown in FIG. 5 in that, when continuously recording information on the recording layers 102 and 103 in the steps S1 through S7 and S9 through S14, the OPC is carried out in advance in its entirety with respect to all of the recording layers to which the information is to be recorded, that is, with respect to the recording layers 102 and 103 in this embodiment. Thereafter, the optical pickup that is not shown is successively moved to the first recording layer 102 and the second recording layer 103 in the steps S16 and S17, and the information is successively recorded on the recording layers 102 and 103 in the steps 58 and S15.

Accordingly, when carrying out the process shown in FIG. 7, the recording operation can be carried out without interruption when switching between the recording layers 102 and 103.

Figure 8:
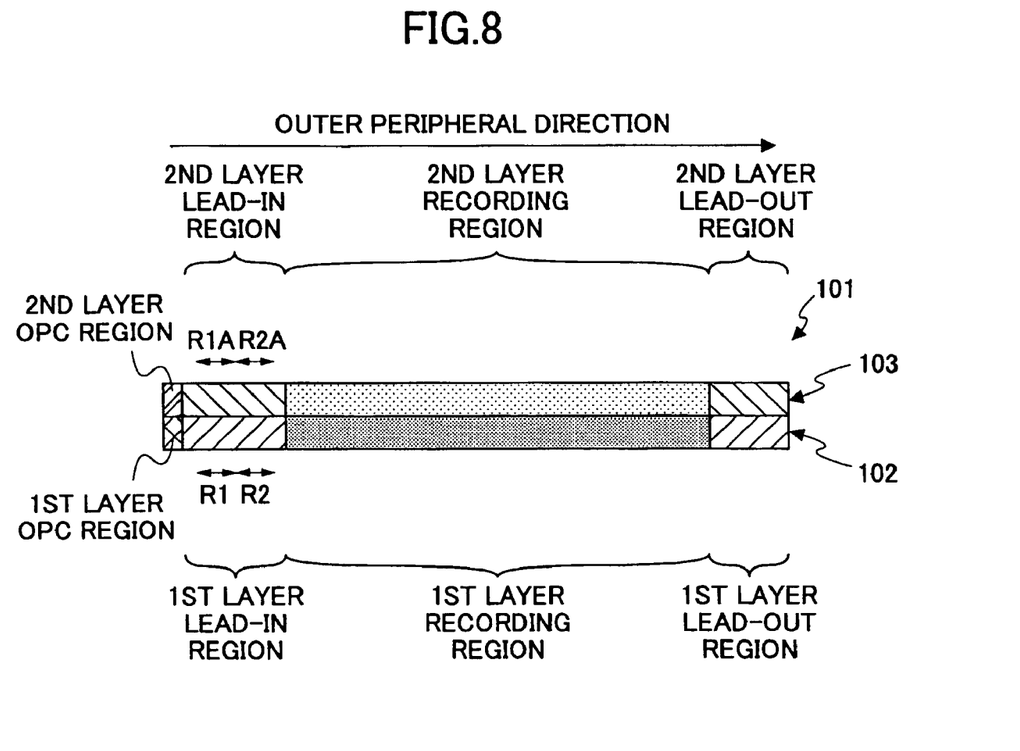
FIG. 8 is a diagram for explaining another media structure.
Figure 9:
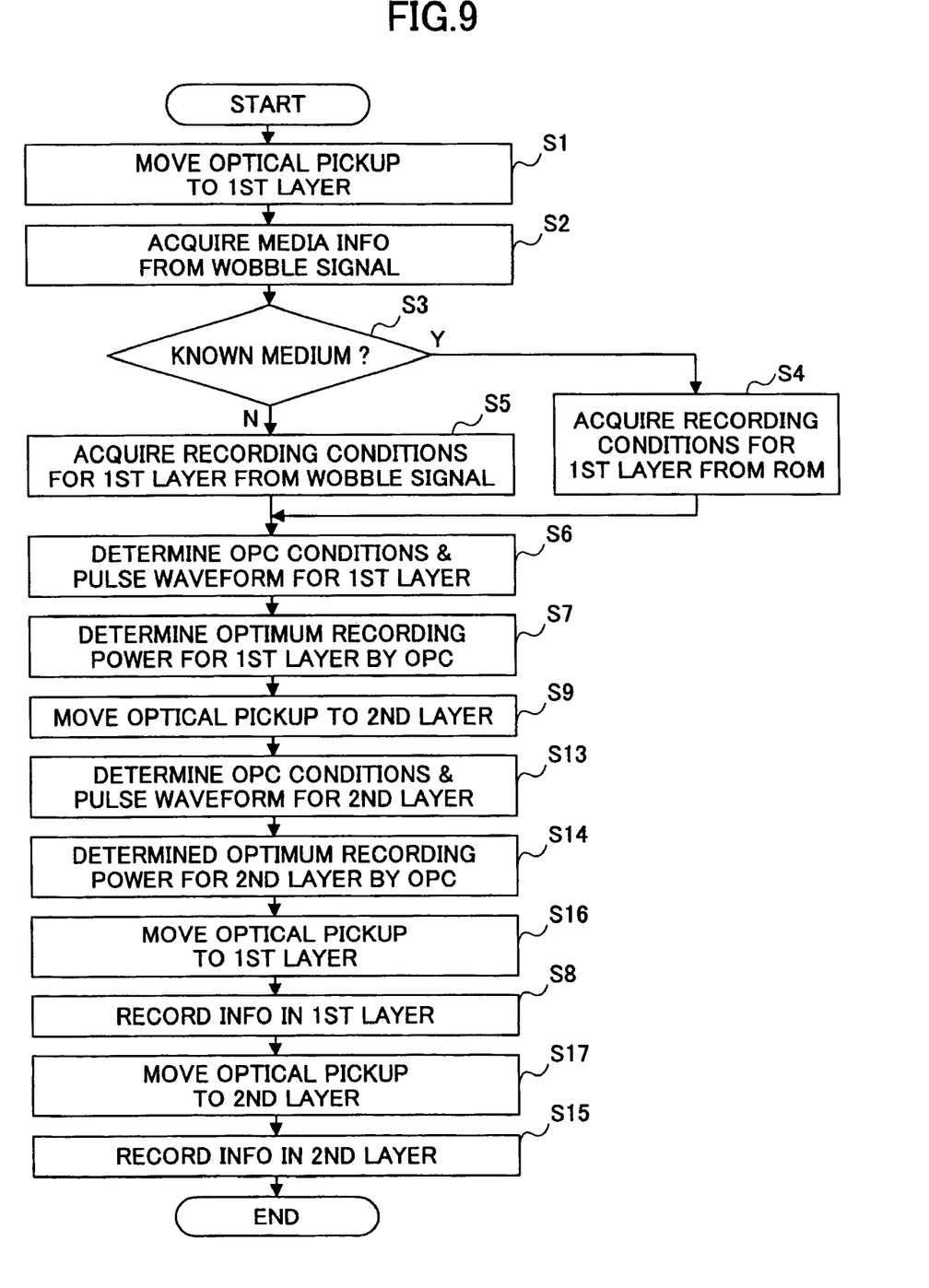
FIG. 9 is a flow chart of another process, carried out by the optical information recording and reproducing apparatus.

In addition, when using a medium 101 shown in FIG. 8, a process shown in FIG. 9 may be carried out in place of the process shown in FIG. 7. FIG. 8 is a diagram for explaining another media structure, and FIG. 9 is a flow chart of another process carried out by the optical information recording and reproducing apparatus 1.

The medium 101 shown in FIG. 8 differs from the medium 101 shown in FIG. 2 in that each of the recording layers 102 and 103 is recorded with the media information and the OPC recording conditions with respect to all of the recording layers 102 and 103. In other words, the media information and the recording conditions for the first recording layer 102 are recorded in the region R1 of the first recording layer, and the media information and the recording conditions for the second recording layer 103 are recorded in the region R2 of the first recording layer 102. Further, the media information and the recording conditions for the first recording layer 102 are recorded in the region R1A of the second recording layer 103, and the media information and the recording conditions for the second recording layer 103 are recorded in the region R2A of the second recording layer 103.

In FIG. 9, those steps which are similar to those corresponding steps in FIG. 7 are designated by the same reference numerals, and a detailed description thereof will be omitted. The process shown in FIG. 9 differs from the process shown in FIG. 7 in that the step S4 does not read the recording conditions of one of the recording layers 102 and 103 but reads the recording conditions of all of the recording layers 102 and 103. Similarly, since the medium having the media structure shown in FIG. 8 is used, the step S5 reproduces the recording conditions for all of the recording layers 102 and 103 from one of the recording layers 102 and 103. As a result, the process of the steps S10 through S12 is omitted.

Since the step S5 simultaneously acquires the recording conditions for all of the recording layers 102 and 103 from one of the recording layers 102 and 103, it is possible to reduce the time required to read the recording conditions even when continuously recording the information with respect to the plurality of recording layers 102 and 103.

Figure 10:
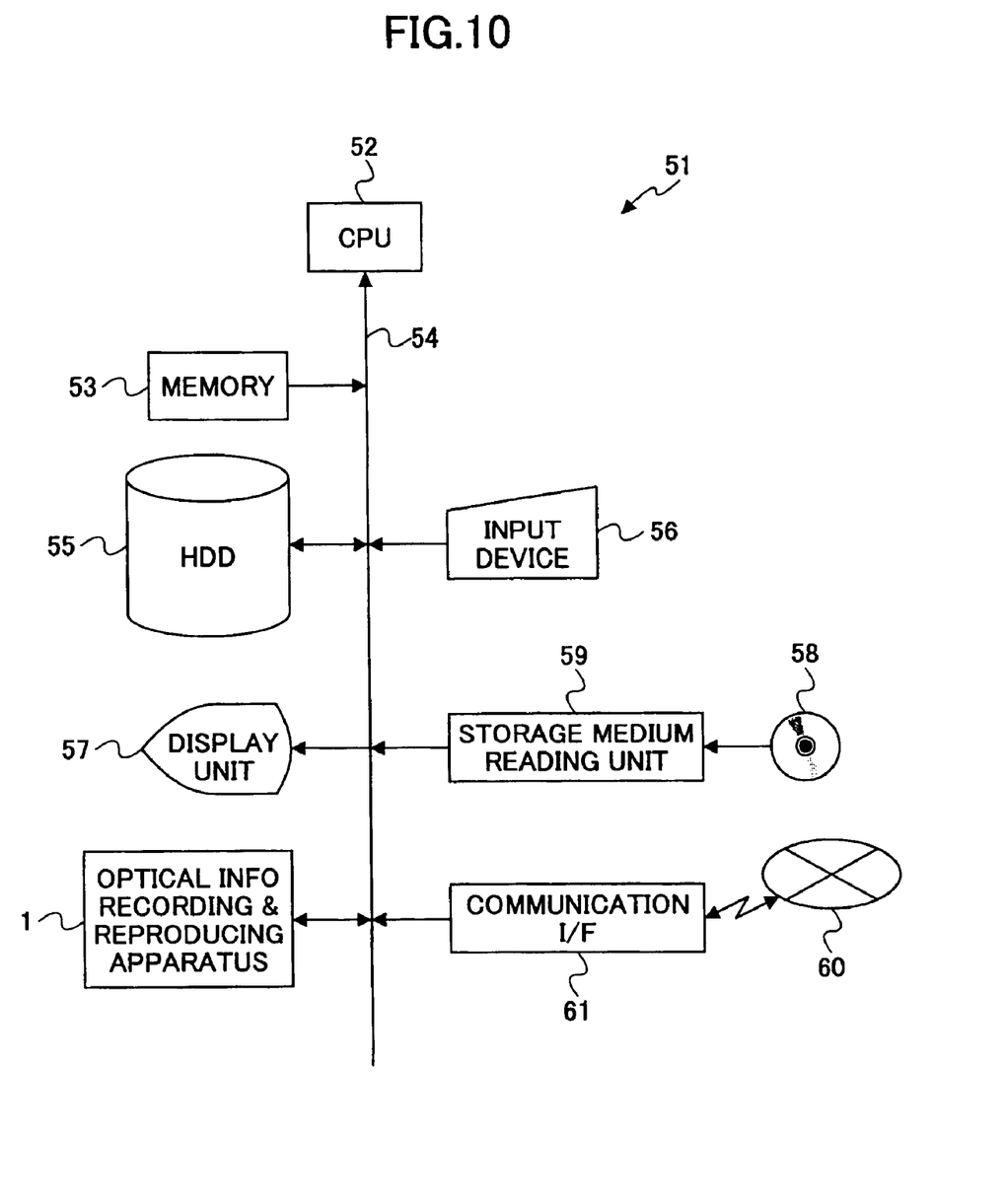
FIG. 10 is a block diagram showing electrical connections of an embodiment of an information processing apparatus according to the present invention.

FIG. 10 is a block diagram showing electrical connections of an information processing apparatus 51 which forms an embodiment of an information processing apparatus according to the present invention. As shown in FIG. 10, the information processing apparatus 51 is formed by a computer such as a personal computer, and includes a CPU 52 and a memory 53 which are connected via a bus 54. The CPU 52 carries out various kinds of operations and centrally controls various parts of the information processing apparatus 51. The memory 53 may be formed by various kinds of memories such as a ROM and a RAM.

A magnetic storage unit 55 such as a Hard Disk Drive (HDD), an input device 56 formed by a mouse, a keyboard or the like, a display unit 57 formed by a LCD, a CRT or the like, a storage medium reading unit 59 for reading a storage medium 58 such as an optical disk, the optical information recording and reproducing apparatus 1, and a predetermined communication interface (I/F) 61 for carrying out a communication via a network 60, are connected to the bus 54 via predetermined interfaces. The communication interface 61 may be connected to a WAN such as the Internet via the network 60. Media employing various systems such as optical disks including CDs and DVDs, magneto-optic disks and flexible disks may be used for the storage medium 58. In addition, an optical disk drive, a magneto-optic disk drive, a flexible disk drive and the like may be used for the storage medium reading unit 59 depending on the kind of storage medium 58 used. Although the storage medium reading unit 59 and the optical information, recording and reproducing apparatus 1 are shown as separate elements in FIG. 10, it is of course possible to realize the storage medium reading unit 59 and the optical information recording and reproducing apparatus 1 by a single apparatus.

In the description of the optical information recording and reproducing apparatus 1 given above, it is a precondition that the processes shown in FIGS. 5, 7 and 9 are carried out by the control of the host controller 21. However, the processes shown in FIGS. 5, 7 and 9 may be realized by the control carried out by the information processing apparatus 51 according to a control program stored in the magnetic storage unit 55.

In this case, the control program stored in the magnetic storage unit 55 forms an embodiment of a program according to the present invention. This control program may be read by the storage medium reading unit 59 from the storage medium 58, which forms an embodiment of a computer-readable storage medium according to the present invention or, downloaded from the WAN such as the Internet, and installed in the magnetic storage unit 55. The information-processing apparatus 51 can carry out the control operation described above by installing this control program therein. The control program may operate on a predetermined Operating System (OS). Moreover, the control program may form a portion of a specific application software.

Further, the present invention is not limited to these embodiments, but various variations and modifications may be made without departing from the scope of the present invention.

What is claimed is:

1. An optical information recording apparatus which records information with respect to an optical information recording medium having a multi-layer structured recording layer made up of a plurality of recording layers each capable of recording information, and carries out an Optimum Power Control (OPC) prior to recording, comprising:
   a recording condition acquiring part configured to read recording conditions that are used when carrying out the OPC from one of the recording layers of the optical information recording medium to which the recording is to be made, each of the recording layers being recorded with the recording conditions therefor; and
   an OPC executing part configured to carry out the OPC using the recording conditions acquired by said recording condition acquiring part.

2. The optical information recording apparatus as claimed in claim 1, wherein said OPC executing part carries out the OPC in advance with respect to all of the recording layers to which the recording is to be made, when continuously carrying out the recording with respect to a plurality of recording layers of the multi-layer structured recording layer.

3. The optical information recording apparatus as claimed in claim 1, wherein said recording condition acquiring part reads the recording conditions for all of the recording layers from one of a plurality of recording layers to which the recording is to be made, when continuously carrying out the recording with respect to the plurality of recording layers of the multi-layer structured recording layer.

4. The optical information recording apparatus as claimed in claim 1, wherein at least a portion of the recording conditions includes a recording power setting for carrying out the OPC.

5. The optical information recording apparatus as claimed in claim 1, wherein at least a portion of the recording conditions includes a recording pulse waveform setting for carrying out the OPC.

6. The optical information recording apparatus as claimed in claim 1, wherein at least a portion of the recording conditions includes a recording light wavelength for carrying out the OPC.

7. The optical information recording apparatus as claimed in claim 1, wherein at least a portion of the recording conditions includes a maximum recording velocity for carrying out the OPC.

8. An information processing apparatus for carrying out various information processing, comprising:
   an optical information recording apparatus configured to record information with respect to an optical information recording medium having a multi-layer structured recording layer made up of a plurality of recording layers each capable of recording information, and to carry out an Optimum Power Control (OPC) prior to recording,
   said optical information recording apparatus comprising:
      a recording condition acquiring part configured to read recording conditions that are used when carrying out the OPC from one of the recording layers of the optical information recording medium to which the recording is to be made, each of the recording layers being recorded with the recording conditions therefor; and
      an OPC executing part configured to carry out the OPC using the recording conditions acquired by said recording condition acquiring part.

9. An optical information recording medium comprising:
   a multi-layer structure recording layer formed by a plurality of recording layers each capable of recording information,
   wherein each of the recording layers is recorded with recording conditions for, all of the recording layers that are used when carrying out an Optimum Power Control (OPC).

10. An optical information recording method which records information with respect to an optical information recording medium having a multi-layer structure recording layer made up of a plurality recording layers each capable of recording information, and carries out an Optimums Power Control (OPC) prior to recording, comprising:
    a recording condition acquiring step reading recording conditions that are used when carrying out the OPC from one of the recording layers of the optical information recording medium to which the recording is to be made, each of the recording layers being recorded with the recording conditions therefor; and
    an OPC executing step carrying out the OPC using the recording conditions acquired by said recording condition acquiring step.

11. The optical information recording method as claimed in claim 10, wherein said OPC executing step carries out the OPC in advance with respect to all of the recording layers to which the recording is to be made, when continuously carrying out the recording with respect to a plurality of recording layers of the multi-layer structured recording layer.

12. The optical information recording method as claimed in claim 10, wherein said recording condition acquiring step reads the recording conditions for all of the recording layers from one of a plurality of recording layers to which the recording is to be made, when continuously carrying out the recording with respect to the plurality of recording layers of the multi-layer structured recording layer.

13. The optical information recording method as claimed in claim 10, wherein at least a portion of the recording conditions includes a recording power setting for carrying out the OPC.

14. The optical information recording method as claimed in claim 10, wherein at least a portion of the recording conditions includes a recording pulse waveform setting for carrying out the OPC.

15. The optical information recording method as claimed in claim 10, wherein at least a portion of the recording conditions includes a recording light wavelength for carrying out the OPC.

16. The optical information recording method as claimed in claim 10, wherein at least a portion of the recording conditions includes a maximum recording velocity for carrying out the OPC.

17. A computer-readable storage medium which stores a program for causing a computer to record information with respect to an optical information recording medium having a multi-layer structured recording layer made up of a plurality of recording layers each capable of recording information, and to carry out an Optimum Power Control (OPC) prior to recording, said program comprising:

a recording condition acquiring procedure causing the computer to read recording conditions that are used when carrying out the OPC from one of the recording layers of the optical information recording medium to which the recording is to be made, each of the recording layers being recorded with the recording conditions therefor; and an OPC executing procedure causing the computer to carry out the OPC using the recording conditions acquired by said recording condition acquiring procedure.

18. The computer-readable storage medium as claimed in claim 17, wherein said OPC executing procedure causes the computer to carry out the OPC in advance with respect to all of the recording layers to which the recording is to be made, when continuously carrying out the recording with respect to a plurality of recording layers of the multi-layer structured recording layer.

19. The computer-readable storage medium as claimed in claim 17, wherein said recording condition acquiring procedure causes the computer to read the recording conditions for all of the recording layers from one of a plurality of recording layers to which the recording is to be made, when continuously carrying out the recording with respect to the plurality of recording layers of the multi-layer structured recording layer.

20. The computer-readable storage medium as claimed in claim 17, wherein the recording conditions includes at least one of a group consisting of a recording power setting for carrying out the OPC, a recording pulse waveform setting for carrying out the OPC, a recording light wavelength for carrying out the OPC, and a maximum recording velocity for carrying out the OPC.

\* \* \* \* \*